United States Patent [19]

Rogers

[11] Patent Number: 4,709,604

[45] Date of Patent: Dec. 1, 1987

[54] APPARATUS FOR MILLING EXTERIOR SURFACES AND REFACING BOTH SHOULDERS OF A TWO-SHOULDER TOOL JOINT

[76] Inventor: John M. Rogers, P.O. Box 777, Luling, Tex. 78648

[21] Appl. No.: 883,987

[22] Filed: Jul. 10, 1986

[51] Int. Cl.$^4$ .............................................. B23B 5/16
[52] U.S. Cl. .................................. 82/4 C; 29/27 A; 408/80; 409/240
[58] Field of Search ................... 82/4 R, 4 C; 408/79, 408/80, 81, 82, 83.5; 144/205; 409/175, 178, 179, 240; 29/27 A

[56] References Cited

U.S. PATENT DOCUMENTS

| | | |
|---|---|---|
| 587,537 | 8/1897 | Van Norman . |
| 1,118,732 | 11/1914 | Breedlove . |
| 1,154,620 | 9/1915 | Eitner . |
| 1,437,552 | 12/1922 | Reading . |
| 1,539,356 | 5/1925 | Horstmann . |
| 1,676,414 | 7/1928 | Romano et al. ................... 408/83.5 |
| 2,092,637 | 9/1937 | Brown . |
| 2,159,287 | 5/1939 | Morgan . |
| 2,177,214 | 10/1939 | Heldenbrand . |
| 2,203,162 | 6/1940 | Lee . |
| 3,181,398 | 5/1965 | Rogers ................................. 82/4 C |
| 3,241,450 | 3/1966 | Morris ................................. 409/240 |
| 3,561,302 | 2/1971 | Keener ................................. 82/4 R |
| 3,691,882 | 9/1972 | Massey ................................. 82/4 C |
| 3,717,055 | 2/1973 | Pendleton ............................. 82/4 C |
| 4,204,784 | 5/1980 | Eckendorff ......................... 408/83.5 |
| 4,414,869 | 11/1983 | Augustine ............................ 82/4 R |
| 4,497,100 | 2/1985 | Wagner ............................... 29/27 A |

Primary Examiner—Nicholas P. Godici
Assistant Examiner—Jerry Kearns

[57] ABSTRACT

A portable multipurpose device for refacing both the make-up shoulder and the secondary shoulder of a two-shoulder tool joint, and for milling the outside surfaces of tool joints and pipes. The device uses a fixed cutting blade and rotates the tool joint to reface the make-up shoulder. The device holds the tool joint steady and uses rotating cutting blades to reface the secondary shoulder.

4 Claims, 16 Drawing Figures

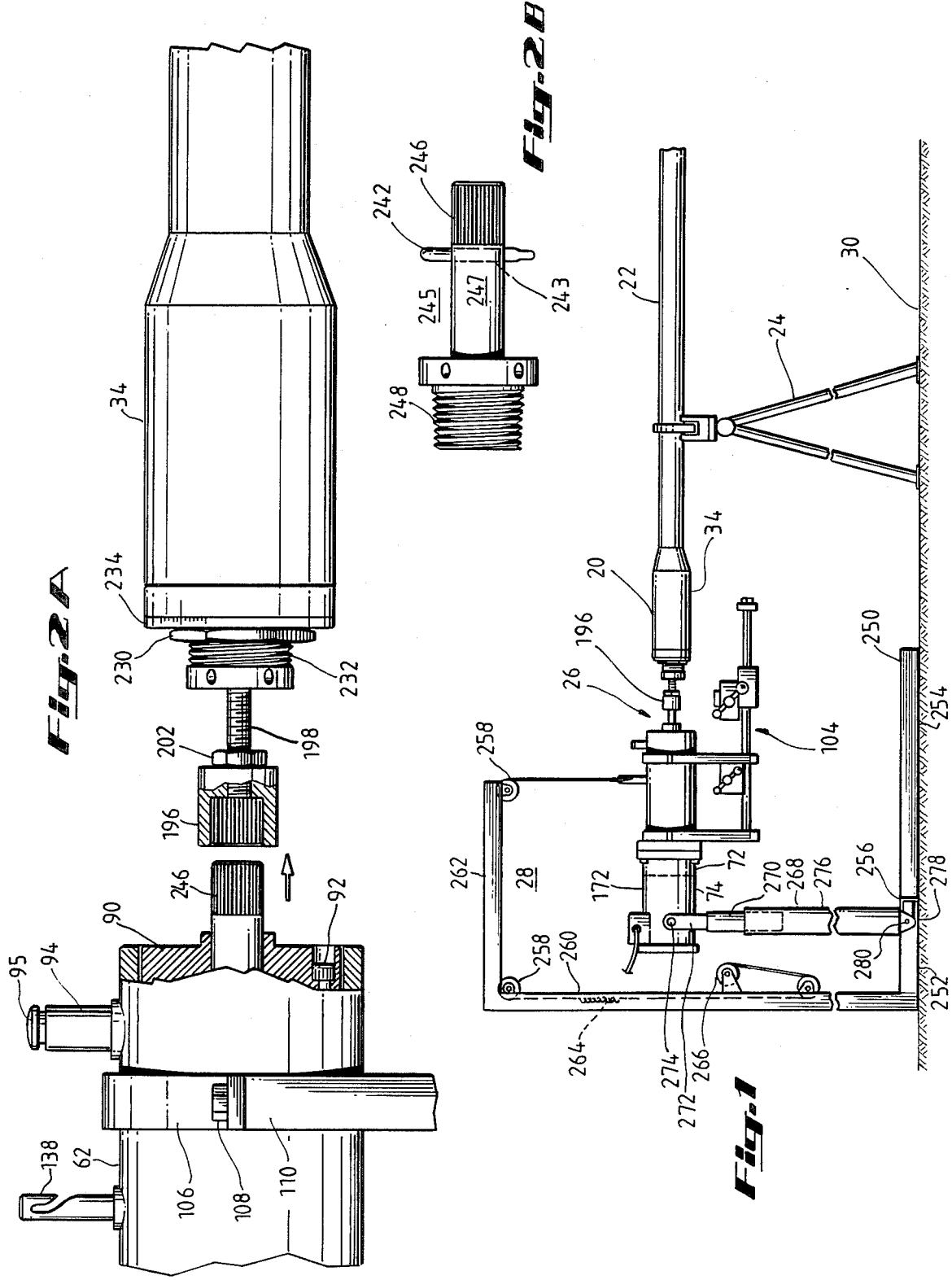

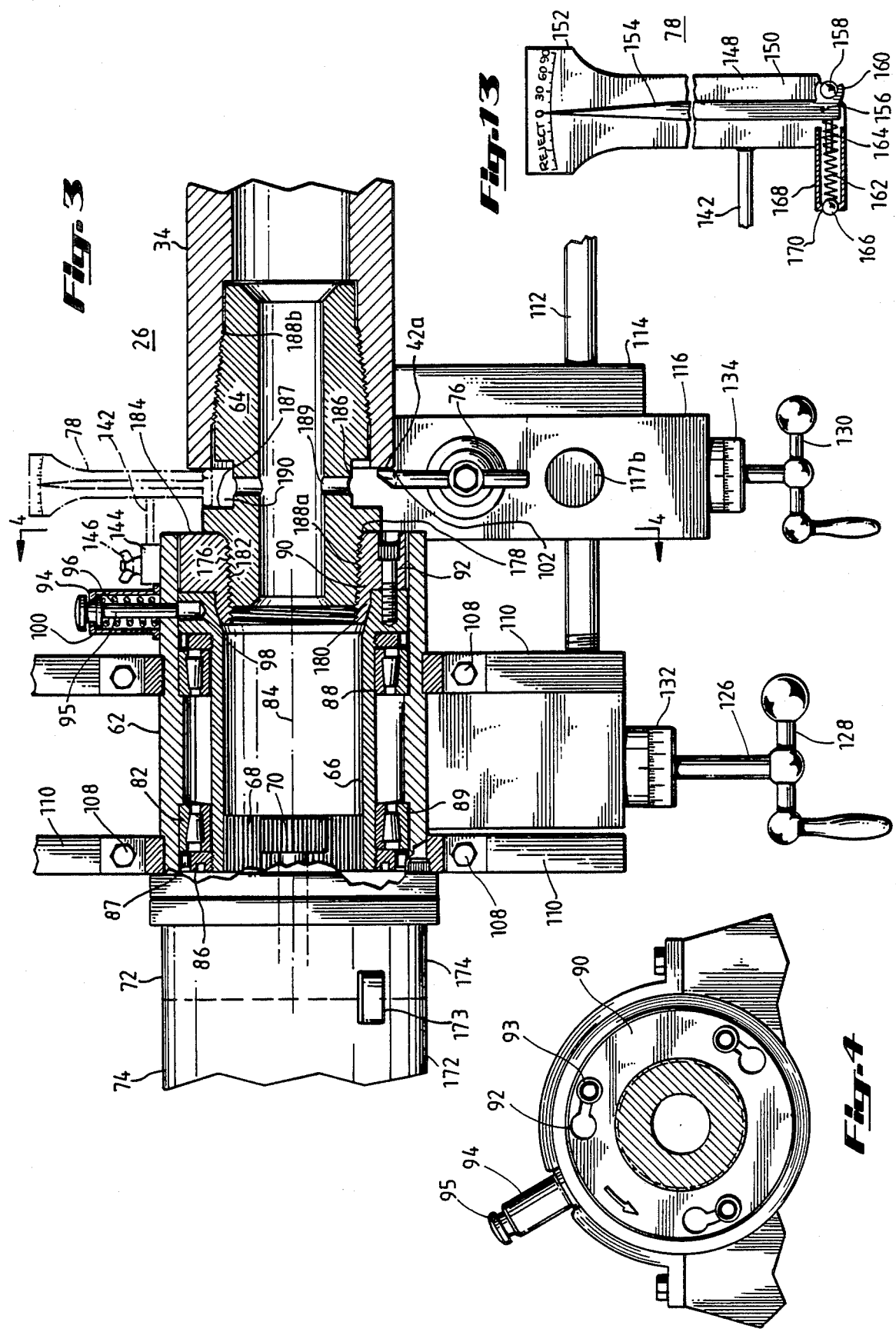

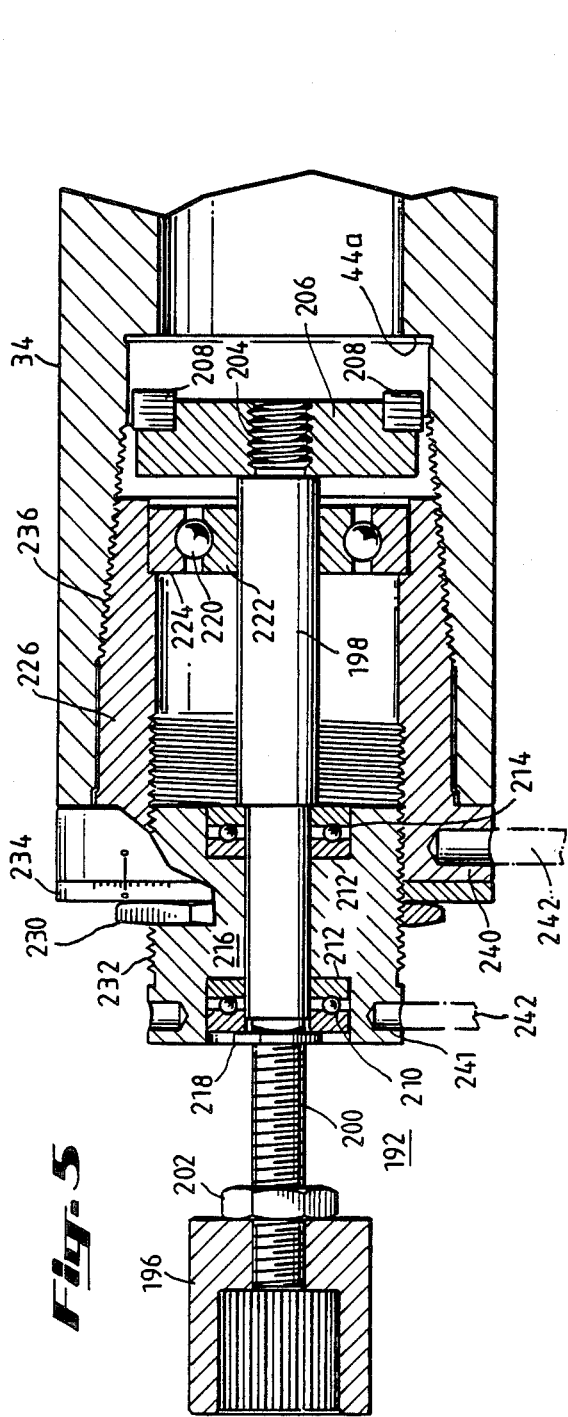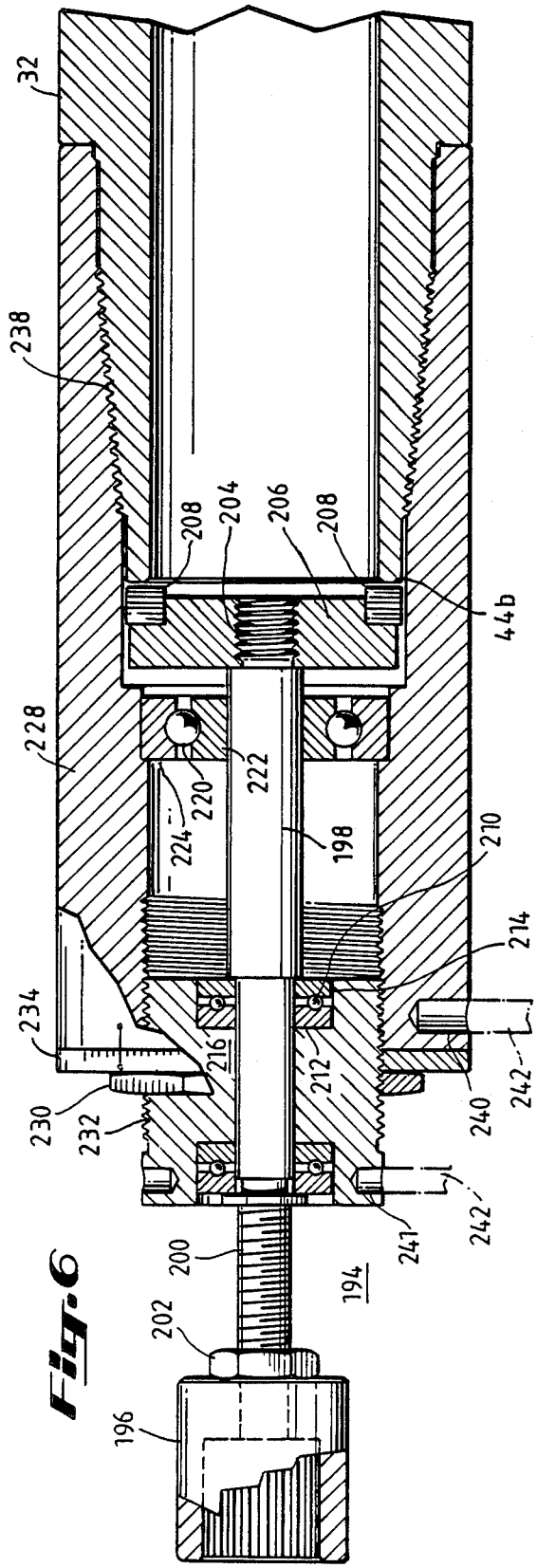

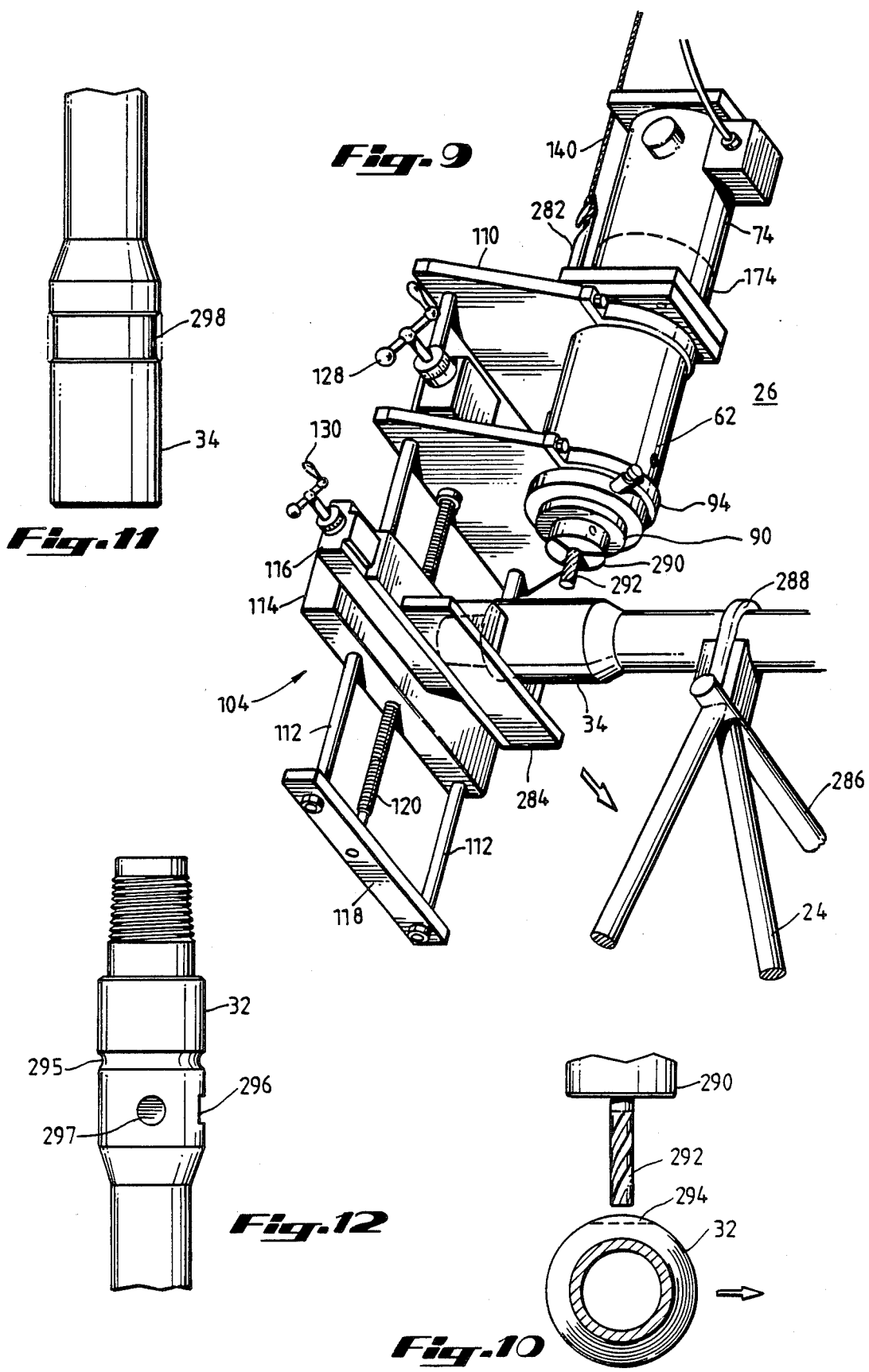

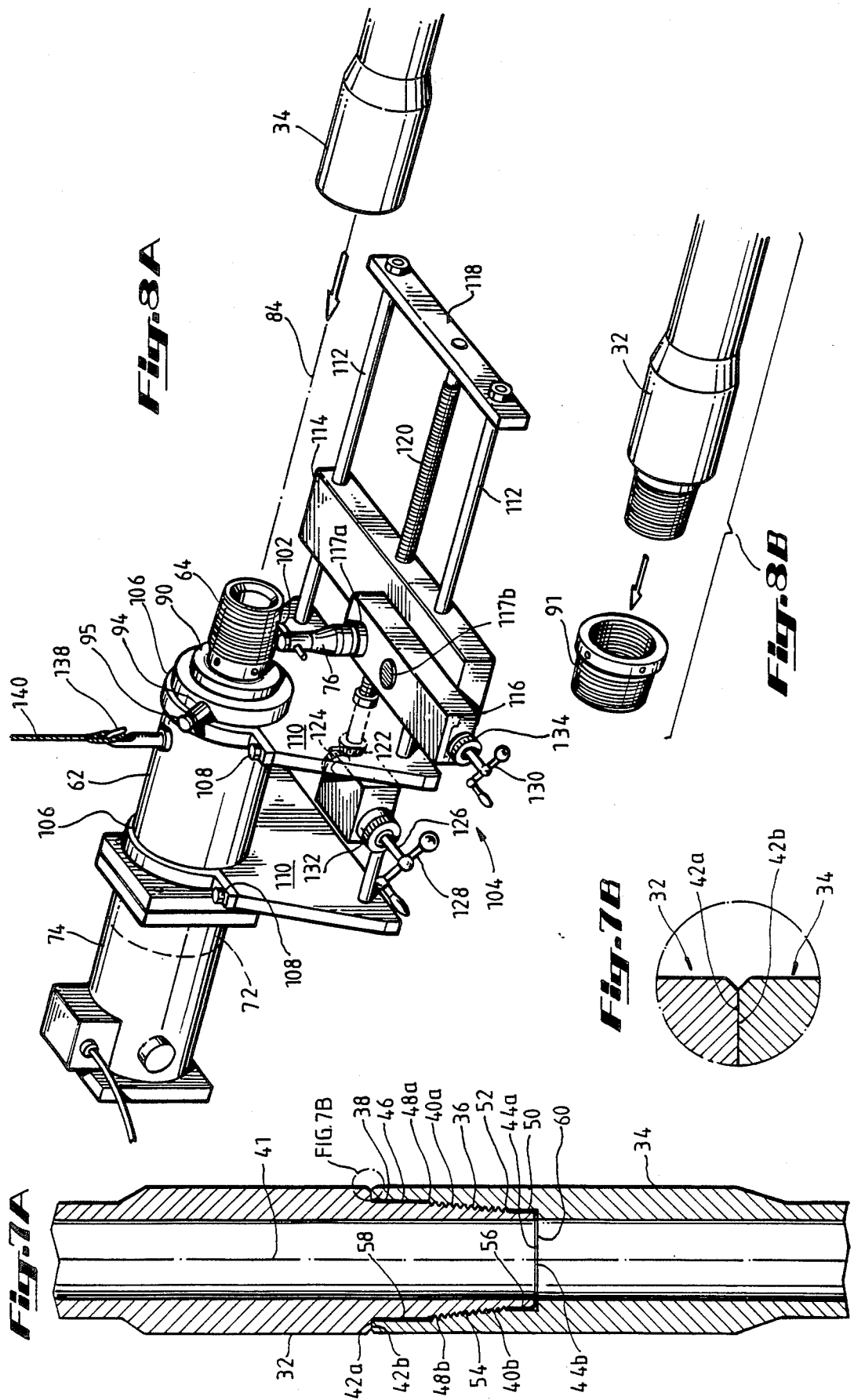

4,709,604

1

APPARATUS FOR MILLING EXTERIOR SURFACES AND REFACING BOTH SHOULDERS OF A TWO-SHOULDER TOOL JOINT

BACKGROUND OF THE INVENTION

1. Field of the Invention

The present invention relates to apparatus for inspecting and reconditioning used pipe and tool joints. More particularly, the present invention is directed to a tool joint reworking device for milling exterior surfaces and refacing both shoulders of a two-shoulder tool joint.

An example of a tool joint that needs frequent inspection and reconditioning is a tool joint used for connecting drill pipe together. The present invention is described in connection with such tool joints, bearing in mind it has equal application to pipes and other types of pipe joints.

The term tool joint is a well-known descriptive name for the couplings at either end of a drill pipe. Drill pipes are removed and added numerous times during the drilling operation and subjected to fluids containing abrasive materials, to significantly wear the screw threads and tool joint faces. Used tool joints must be inspected frequently to prevent leakage at the tool joints and to eliminate uneven tool joint faces that can make it difficult to disengage the tool joints.

2. Description of the Related Art

In the past it has been the practice to individually inspect each tool joint at the rig site with a gauging tool to detect the thread wear and irregularities in the tool joint face that cannot be located by visual inspection. The used drill pipe that had to be refaced was shipped to a machine shop where a lathe type apparatus was set up to rework the tool joint face and, usually at the same time, to rethread the tool joint. Considerable time was involved in getting the used pipe to the shop and, in many cases, rethreading of a drill pipe was not necessary even though the tool joint face had to be reworked. The machine in the shop that performed the refacing and rethreading operation was large and expensive, discouraging portable operation at the rig site.

In the refacing of a tool joint it is important that the new tool joint face be cut in relation to the axis of the tool joint, as determined by the screw thread. Errors up to 35/1000 of an inch have been measured on make-up shoulders refaced by a stationary machine in a shop. When a tool joint has part of its make-up shoulder 35/1000 of an inch lower than the rest of the shoulder, the tool joint will leak badly during drilling operations. The accurate alignment of the cutting tool is accomplished in the shop machinery by aligned chucks and, usually, the threads of the tool joint are reworked, to assure proper relationship with the tool joint face. The need remains for a refacing device that is portable and inexpensive enough for a tool pusher to have a set up at the rig site to inspect a tool joint and perform the refacing operation.

Often during drilling operations a pipe will be bent. When an operator attempts to reface the make-up shoulder of a tool joint on a bent pipe, using a stationary refacing device in a machine shop, the result is usually that the make-up shoulder is not refaced evenly, resulting in a tool joint that during operation will leak badly. The need remains for a refacing device that is portable and inexpensive enough for a tool pusher to have a set up at the rig site to not only inspect and reface tool joints on straight pipe, but also to inspect and reface tool joints on bent pipe.

A prior invention by the inventor of the present invention provided an apparatus for the refacing of tool joints having only make-up shoulders. That invention is disclosed in U.S. Pat. No. 3,181,398 issued May 4, 1965 to J. N. Rogers, which is incorporated herein by reference. Although the prior apparatus was excellent for refacing tool joints having only make-up shoulders, it is inadequate for refacing tool joints having make-up and secondary shoulders. Since the industry is using an increasing number of tool joints having both make-up shoulders and secondary shoulders in drilling operations, the need exists for a refacing device that can reface both the make-up shoulder and the secondary shoulder of a tool joint, while maintaining the original distance between those two shoulders.

SUMMARY OF THE INVENTION

The above-noted and other drawbacks of the prior art are overcome by providing a method and apparatus for refacing two-shoulder tool joints, which features the capability of both milling the exterior surfaces of a tool joint for identification purposes and refacing both shoulders of a two-shoulder tool joint, and which can achieve the required result of maintaining the original distance between the make-up shoulder and the secondary shoulder of a two-shoulder tool joint. The undesirable limitation of only being able to reface the make-up shoulder of a tool joint, such limitation being common to prior art devices, is eliminated by the invention. The invention is believed to be the first portable tool joint reworking device which can achieve both identification milling of exterior surfaces of a tool joint and accurate refacing of both shoulders of a two-shoulder tool joint.

The above-noted and other features of the present invention will become more apparent from a detailed description of the preferred embodiment when read in conjunction with the drawings.

BRIEF DESCRIPTION OF THE DRAWINGS

The invention will further be described by reference to the accompanying drawings which illustrate the preferred embodiment of the present invention, wherein like members bear like reference numerals and wherein:

FIG. 1 is an elevation view in partial section of a multipurpose device according to one embodiment of the present invention, showing a suspension apparatus, a refacing device connected for refacing the secondary shoulder of a box-type tool joint, and a pipe rack stand;

FIG. 2A is an enlargement of a portion of FIG. 1 showing in greater detail parts of the refacing device and its connection to the box-type tool joint;

FIG. 2B depicts an adapter for using the refacing device for refacing secondary shoulders;

FIG. 3 is a plan view in partial section of the preferred embodiment of a tool joint refacing device, illustrating the refacing of the make-up shoulder of a box-type tool joint;

FIG. 4 is a cross-sectional view of one end of an adapter for using the mandrel of the refacing device to rotate the pipe joint whose make-up shoulder is being refaced;

FIG. 5 is a plan view in partial section of a cutting device to be connected to the refacing device of the present invention, illustrating the connection to a box-type tool joint for the refacing of the secondary shoulder of a box-type tool joint;

FIG. 6 is a plan view in partial section of a cutting device to be connected to the refacing device of the present invention, illustrating the connection to a pin-type tool joint for the refacing of the secondary shoulder of a pin-type tool joint;

FIG. 7A is a longitudinal sectional view of a two-shoulder pin-type tool joint connected to a two-shoulder box-type tool joint, illustrating the mode of connection between tool joints as an aid to understanding the present invention;

FIG. 7B is an enlargement of the portion of FIG. 7A circled and identified by the reference mark 7B, showing the abutting make-up shoulders of the tool joints that are properly machined;

FIG. 8A is a perspective view of the refacing device having a cutting device and adapter for refacing the make-up shoulder of a box-type tool joint, and having a carriage for supporting the cutting device;

FIG. 8B is a perspective view of an adapter used when refacing the make-up shoulder of a pin-type tool joint;

FIG. 9 is a perspective view of the refacing device used in a vertical position when milling identification grooves, flats, and holes, showing in detail the carriage, a right-angle bracket for use in milling the outside surfaces, and the milling tool;

FIG. 10 is a plan view depicting the milling tool and a proposed spot to be milled;

FIG. 11 is a plan view of a box-type tool joint with a hardbanding groove cut on its outside surface using the milling tool of the present invention;

FIG. 12 is a plan view of a pin-type tool joint with an identification groove cut and portions milled on its outside surface using the milling tool of the present invention; and FIG. 13 is a plan view in partial section showing one form of a gauge according to the present invention, the type used in the apparatus of FIG. 3, that indicates the amount of tool joint make-up shoulder to remove.

DESCRIPTION OF A PREFERRED EMBODIMENT

As an introduction to the present invention, FIG. 1 shows a typical set-up at a rig site, comprising a tool joint 20 connected to a drill pipe 22, of which only a portion is shown, one of several pipe rack stands 24, a tool joint refacing device 26 connected to the tool joint 20, and a support means, or suspension apparatus 28 resting on the ground 30. Although only one refacing device 26 is shown in FIG. 1, two such devices may be used at the same time on one pipe: one device at either end of the pipe.

While the tool joint is a familiar device in the oil field, manufacturers have introduced new models of tool joints with improved characteristics. One new model, illustrated in FIGS. 7A and 7B, can allegedly withstand forty percent more torque than a standard tool joint. FIGS. 7A and 7B illustrate a pin tool joint 32 coupled to a box tool joint 34. The box tool joint 34 has a conically shaped opening 36 with side walls that converge inward from an exterior open end 38. The side walls of the box tool joint opening 36 are threaded with a screw thread 40a, helically extending about an axis 41 of the box tool joint 34. The opening 36 of the box tool joint 34 has a primary or sealing shoulder 42a, which is often referred to in the industry as a "make-up" shoulder. The box tool joint 34 also includes a secondary shoulder 44a. The opening 36 of the box tool joint also includes a primary counterbored section 46 which extends from first threads 48a of the box opening 36 to the make-up shoulder 42a. A secondary counterbored section 50 extends from a last thread 52 of the box opening 36 to a secondary shoulder 44a.

The pin tool joint 32 includes an extension 54. The extension 54 includes screw threads 40b, helically extending about the axis 41 of the pin tool joint 32, wherein the threaded part of the extension 54 is conical in shape having a smaller diameter at the end next to a pin nose 56. The pin tool joint extension 54 also includes a make-up shoulder 42b, a secondary shoulder 44b at the tip end of the pin nose 56, and a pin base 58 extending from the make-up shoulder 42b to a last thread 48b of the extension 54. The extension 54 has a screw thread 40b on its outer surface that mates with the screw thread 40a on box joint opening 36. The screw threads 40a and 40b are generally referred to as taper threads in the pipe industry, as they are disposed on tapered surfaces that match when brough together to form a fluid-tight tool joint. When the pin tool joint 32 and the box tool joint 34 are screwed together, a fluidtight seal occurs between the sealing or make-up shoulder 42a on the box tool joint 34 and the make-up shoulder 42b on the pin tool joint 32. Each of tool joint shoulders 42a and 42b lies in a plane that is transverse to the tool joint axis 41.

As shown in FIG. 7B, which is a blow-up of the interface between the tool joints 32 and 34, when a pin tool joint and a box tool joint are properly screwed together, there is no gap or spacing between make-up shoulders 42a and 42b. There is, however, a gap 60 between the secondary shoulder 44a of the box tool joint 34 and the secondary shoulder 44b of the pin tool point 32. The torque exerted when the pin tool joint 32 is screwed into the box tool joint 34 is called "make-up" torque. When a high torque situation is encountered and drilling torque exceeds make-up torque, the connection further tightens. This is referred to a "downhole make-up". In the past, the majority of tool joint failures have been caused by downhole make-up. However, with the new models of tool joints as shown in FIG. 7, when a over-torque situation is encountered and further tightening, called "downhole make-up", occurs, the secondary shoulders 44a and 44b will make contact and retard additional make-up, thus providing an increase in the tool joint's torque capacity.

Tool joints are originally machined with a tolerance, so that 15/1000 of an inch of the tool joint shoulders can be removed to bring the tool joint screw threads into complete metal-to-metal contact. A prior invention by the inventor of the present device provides an apparatus for refacing tool joints having only make-up shoulders. That invention is disclosed in U.S. Pat. No. 3,181,398 issued May 4, 1965, to J. M. Rogers. Although the prior invention has been excellent for refacing tool joints having only make-up shoulders, it is insufficient for refacing tool joints having make-up and secondary shoulders, such as the type shown in FIGS. 7A and 7B. This is because the distance from the make-up shoulder 42 to the secondary shoulder 44 is important and must not be altered. Therefore, when refacing the shoulders of, for example, the pin tool joint 32 of FIGS. 7A and 7B, the amount of material removed from the make-up shoulder 42b must be carefully measured and that same amount must be removed from the secondary shoulder 44b. Likewise, when refacing the shoulders of the box tool joint 34, the amount of material removed from the make-up shoulder 42a must be carefully measured and the same amount of material must be removed from the secondary shoulder 44a.

The present invention makes use of pin and box adapters which have the specifications of new tool joints and are manufactured from exceptionally hard and durable metal. The adapters align the refacing device 26 so as to gauge and reface the shoulder of a tool joint precisely to the specification of a new tool joint. FIG. 3 is a top view illustrating one embodiment of a housing 62 in which has been screwed a double pin adapter or connector 64 for use in refacing the make-up shoulder 42a of a box tool joint 34. The housing 62 has a mandrel 66 to which is connected a spline bushing 68. The mandrel 66 is a rotatable member. The spline bushing 68 receives the drive spline 70 from a gear reduction box 72 which in turn is connected to motor 74. The combination of the spline bushing 68, the drive spline 70, the gear box 72, and the motor 74 constitutes a rotating means. The motor 74 is also illustrated in FIG. 1, FIG. 8A, and FIG. 9.

Used with the housing 62 is a cutting means or device 76 to reface the make-up shoulders 42a and 42b, and a gauge 78 to gauge the amount of tool joint shoulder that may be removed. The cutting device 76 and gauge 78 do not rotate with the mandrel 66. The mandrel 66 rotates within roller bearings 82 which are coaxial with the rotational axis 84 of the mandrel. Each roller bearing 82 has attached to it a bearing adjusting nut 86 for adjusting the bearing to keep it coaxial with the rotational axis 84. An oil seal ring 87 for each bearing keeps the bearing oil from leaking out of the bearing. Each roller bearing 82 has an inner race 88 attached to the mandrel 66 and an outer race 89 attached to the inner wall of the housing 62. In the embodiment shown in FIG. 3, a drive ring adapter or connector 90 for refacing a pin tool joint make-up shoulder is shown attached to the mandrel 66. A size adapter or connector 91 (FIG. 8B) is one of many different size adapter that are used to adapt any diameter and any type of thread of a pin end tool joint 32 to the one size drive ring adapter 90. The drive ring adapter 90 and the mandrel 66, alone or in combination with the size adapter 91 and double pin adapter 64, constitute a first engaging means for engaging the screw thread of any tool joint 20.

In the previous invention of U.S. Pat. No. 3,181,398, the mandrel had a smaller internal diameter than the drive ring adapter. To use the same size mandrel to reface the make-up shoulder of a two-shoulder tool joint would mean that the make-up shoulder would be an undersirably large distance from the closest roller bearing 82 supporting the mandrel. Thus, any end tolerance in the bearing 82 would be magnified to undersirable proportions, preventing refacing to close tolerances. In the past, customers have required tolerances small enough so that the refaced make-up shoulder could seal against 10,000 psi. Therefore, to allow the make-up shoulder of a two-shoulder tool joint to be close to the closest roller bearing 82, the mandrel 66 of the present invention has been designed with an internal diameter larger than the internal diameter of the drive ring adapter 90. The large diameter of the mandrel allows the pin end of the pin tool joint 32 to protrude past the adapter 90 into the middle of the mandrel 66, when a pin tool joint is screwed into the drive ring adapter 90.

Referring now to FIG. 4, which is an end view taken along the reference line 4—4 of the device illustrated in FIG. 3, three socket head screws 92 attach the drive ring adapter 90 to the mandrel 66. The drive ring adapter 90 has three slots 93. Each slot 93 has a smaller portion having a width equal to the diameter of the socket head screw, and a larger portion having a diameter slightly larger than the head of the socket head screw. Thus, the drive ring adapter 90 can be quickly removed by merely loosening the screws 92 and rotating the adapter a few degrees until the heads of the socket head screws 92 enter the larger portions of the slots 93. Only one of such socket head screws 92 is shown in the top view of FIG. 3.

Referring again to FIG. 3, the housing 62 also includes a locking pin housing 94 containing a locking pin 95 which is spring-biased by spring 96 away from the pin cavity 98 in the mandrel 66. The locking pin housing 94 also contains a pin locking ring 100 which is operable to keep the locking pin 95 inserted into the pin cavity 98 of the mandrel. As long as the locking pin 95 is in the pin cavity 98, the mandrel 66 cannot rotate. This locking action serves to reduce the stress on the gears of the gear reduction box 72 when tool joints are being connected and disconnected to the mandrel 66.

Referring now to FIG. 8A, the cutting device 76 is connected to the housing 62. The cutting device 76 comprises a cutting blade 102. The device 76 is arranged to dispose the cutting blade 102 for transverse and parallel movement with respect to the mandrel axis 84 to reface the make-up shoulder 42a of the box tool joint 34. Several types of feed mechanisms may be used to control the position of the cutting blade 102, as is well-known in the art of turning tools.

A carriage 104 provides for movement of the cutting device 76 parallel to and perpendicular to mandrel rotational axis 84. Two clamps 106 connect the carriage 104 to the housing 62. Four cap screws 108 secure the clamps 106 to two trapezoidal-shaped brackets 110 of the carriage. Two rails 112 pass through apertures in the brackets 110 and through apertures in a base plate 114, to support the base plate. Although a refacing device might be operable if only one bracket 110 were used, using two brackets gives the necessary rigidity for milling hard-banding grooves on ten-inch outside diameter pipe. When milling such tool joints, the base plate 114 is at its farthest position, fourteen inches, from the closest bracket 110. The rails 112 are secured at their ends away from the brackets 110 by a rail bracket 118.

Attached to the base plate 114 is a mounting plate 116 on which the cutting device 76 is attached. The mounting plate 116 has two different mounting positions 117a and 117b at which the cutting device 76 may be mounted. When mounted at position 117a as shown in FIG. 8A, the cutting device 76 can reface the make-up shoulder 42 of tool joints 20 ranging in size from ¾ inch to four inches outside diameter. When mounted at position 117b, the cutting device can reface tool joints ranging in size from four inches to ten inches outside diameter.

The base plate 114 moves along the rails 112 in a movement parallel to the rotational axis 84 of the mandrel. The movement of the base plate 114 along the rails 112 is achieved by means of a threaded rod 120 secured at one end to the rail bracket 118, passing through an aperture in the base plate 114, and having at its other end a ring gear 122. The ring gear 122 meshes with a pinion gear 124 attached to a pinion gear shaft 126, which in turn has a handle 128 for turning the pinion gear shaft and thus moving the base plate 114 along the threaded rod 120. The gear reduction ratio between the ring gear 122 and the pinion gear 124 is a two-to-one ratio. Movement of the mounting plate 116 in a direction transverse to the rotational axis 84 is provided by turning the handle 130. A Vernier scale 132 indicates movement of the baseplate 114 in 5/1000 inch increments. One complete rotation of the shaft 126 indicates a movement of 50/1000 inch. A Vernier scale 134 similarly indicates movement of the mounting plate 116. The mechanism for providing this movement is well known in the art and is described in U.S. Pat. No. 3,181,398, which is incorporated herein by reference.

Referring back to FIG. 1, attached to the housing 62 is a hook 138 to which is connected a cable 140 of the suspension apparatus 28.

Referring back to FIG. 3, the gauge 78 is supported by housing 62 through a mounting arm 142 that is held in a support block 144 attached to the housing 62. The gauge 78 may be pivoted about support block 144 and moved parallel to the mandrel axis 84 by loosening the wing nut 146 that clamps the mounting arm 142 in the support block 144.

Referring now to FIG. 13, the gauge 78 is composed of a frame 148 having a flat frame face 150 with an index scale 152 at one end, calibrated in units of length. At the opposite end of the flat frame face 150 from the scale 152, a pointer 154 is pivotally attached by a pin 156. Pointer 154 is of substantial length and extends to move along the scale 152 as the pointer 154 is pivoted. The position of pointer 154 is determined by the engagement of a ball contact member 158 loosely held in a socket 160 for rotational movement without dropping out. The pointer 154 is biased by means of a spring 162, retained in place by a guide rod 164 attached to the pointer 154 on the opposite side from the contact member 158. The spring 162 acts against a ball contact member 166 held in a tubular retainer 168. Retainer 168 is opened at both ends and is attached to the frame 148. The contact member 166 is biased against an inwardly inclined lip 170 by spring 162 to prevent the contact member 166 from falling out.

It can be seen that the gauge 78 is arranged to have the contact members 158 and 166 inserted in a space between the faces of two members to gauge the gap between the faces. The pointer 154 pivots to indicate on scale 152 the gap dimension. The gauge 78 is also useful to measure the spacing when one or both of the member faces is moving, since the contact members 158 and 166 are free to rotate without changing the position of pointer 154. The contact members 158 and 166 significantly reduce frictional effect and, with hard balls similar to ball bearings, substantial gauge life is realized. The scale 152 can be calibrated in thousandths of an inch, the illustrated scale having a maximum scale deflection of 90/1000 of an inch to the right (as viewed in FIG. 13), from the upright zero position of pointer 154, and a marking of "reject" to the left of the zero position.

Referring back to FIG. 3, the motor 74 is coupled through the gear reduction box 72 and drive spline 70 and spline bushing 68 to rotatably drive the mandrel 66. A number of types of motors may be used, such as an electric or an air-driven motor. The motor 74 has a casing 172 that is mechanically coupled by a casing bracket 173 to the housing 174 of the gear reduction box 72. The gear reduction box 72 may take many forms, the purpose being to reduce rotational speed and to increase torque capacity. The gear reduction box 72 may be eliminated where a motor of suitable rotational speed and torque capacity is available for direct coupling to the mandrel 66.

Precise alignment of the tool joint refacing device 26 is provided by the use of adapters that are removably attached to the mandrel 66. The drive ring adapter 90 is used alone for refacing the make-up shoulder 42b of the pin tool joint 32 (FIG. 3 and FIG. 8A). The double pin adapter 64 is used together with the drive ring adapter 90 for refacing the make-up shoulder 42a of the box tool joint 34 (FIG. 3 and FIG. 8A). The adapter 90 comprises an annular ring with a conically shaped aperture 176 arranged, when fastened to the mandrel 66, to extend coaxially with the mandrel axis 84. The walls of conical aperture 176 converge from the largest diameter at the housing opening 178 to the smallest diameter at the mandrel plate aperture 180. The inside wall of the adapter aperture 176 comprises a screw thread 182 extending helically about the axis 84 of mandrel 66. The screw thread 182 is designed in conjunction with the taper of the conical aperture 176 to the specification of a new box-type tool joint. The adapter 90 is made from a hardened metal that resists wear and is durable so that the adapter 90 is in essence a standard adapter with which the used pin tool joints can be prepared.

One notable difference between the adapter 90 and a typical box-type tool joint is that the screw thread 182 does not extend as far in the adapter 90. In other words, when a pin-type tool joint is tightly screwed into the adapter 90, a substantial length of the screw thread will not be engaged, leaving a gap between the make-up shoulder 42b and the adapter outer face 184. Such a gap is shown as gap 120 in FIG. 3 of U.S. Pat. No. 3,181,398. As pointed out in that patent in Column 6, for every used tool joint that meets the specification of a new tool joint, the distance of the gap will be the same. But, for a used tool joint that has worn threads, the tool joint will screw farther into the adapter 90 and the distance of the gap will decrease. Therefore, the dimension of the gap is a direct check on how much of the make-up shoulder of the tool must be removed to permit the tool joint make-up shoulders to come together with the screw threads in tight engagement.

A box tool joint can be checked in a similar fashion. In the invention of U.S. Pat. No. 3,181,398, an entirely separate adapter was used for resurfacing the make-up shoulder of a box tool joint. However, in the present invention, as mentioned earlier, for checking box end tool joints, the drive ring adapter 90 is left attached to the mandrel 66, and the double pin adapter 64 is screwed into the drive ring adapter 90. This connection is illustrated in FIG. 3.

The double pin adapter 64 has a middle section 186 from which the sides taper conically in threaded portions 188 to both ends. The threaded portions 188a and 188b are arranged in accordance with the specification of a new pin tool joint. Different adapters 64 have the same size and type of threads 188a, but threads 188b will vary in size and type to fit different size box tool joints 34, since tool joints can vary in size from four inches outside diameter to ten inches outside diameter. A hole 189 passes through the adapter 64 in the middle section 186. A circular bar is passed through the hole 189 and then used to loosen or tighten the adapter 64 in the adapter 90. Such a bar is also used to hold adapter 64 in place while tightening or loosening a box tool joint on the adapter 64. When the double pin adapter 64 is screwed into tight engagement with the ring adapter 90, and a new box-type tool joint is screwed into tight engagement at the other end of the double pin adapter 64, the make-up shoulder 42a of the box-type tool joint 34 will come up on the adapter end to a point where the taper begins, immediately adjacent the adapter middle portion 186. An outward-facing face 187 of the middle portion 186 constitutes a reference means. The face 187 and the make-up shoulder 42a form a gap 190 with a dimension, when the box tool joint 34 is a new tool joint, that can be determined and appropriately marked for gauging the variation of other box tool joints. A box tool joint that has a worn thread will produce a smaller dimension for gap 190, and tool joints on which no more material can be removed from the make-up shoulder 42a will have an excessively large dimension for gap 190. Adapter 64 can be made from the same type of hardened, durable metal, as described for adapter 90.

Gauge 78 can be disposed in gap 190 to place contact member 166 in engagement with the outward-facing face 187 and contact member 158 in engagement with make-up shoulder 42a. The gauge pointer 154 will then indicate the gap dimension. As shown in FIG. 13, the scale 152 indicates zero when the gap spacing is identical to spacing for a new or properly machined box tool joint. If pointer 154 moves to the right, as viewed in FIG. 13, the dimension for gap 190 is small and the pointer 154 indicates the amount of make-up shoulder that can be removed. If the pointer 154 moves to the left, the dimension of the gap 190 is larger than for a new tool joint, and the make-up shoulder 42a cannot be reworked without having to rethread the tool joint. In this instance, on-the-site refacing of the make-up shoulder cannot be accomplished, and the scale 152 appropriately indicates that the box tool joint is a "reject". In essence, it can be seen that each of the adapters 64 and 90 functions as a standard, and by using the reference means on the adapter, the variation of a used tool joint from the standard can be determined.

However, as mentioned earlier, when refacing the shoulders of a two-shoulder tool joint, the distance from the make-up shoulder to the secondary shoulder must not be changed. Therefore, whenever a make-up shoulder is refaced, the secondary shoulder must also be refaced, taking care to remove exactly the same amount of material from each shoulder.

Referring now to FIGS. 5 and 6, a cutting device 192 is illustrated in FIG. 5 for refacing the secondary shoulder of a box tool joint, and a cutting device 194 is illustrated in FIG. 6 for refacing the secondary shoulder of a pin tool joint. The cutting devices 192 and 194 are secondary shoulder adapters for refacing the secondary shoulder of a two-shoulder tool joint. Many of the elements in the two cutting devices are the same, and like reference numerals refer to like elements. A splined bushing 196 is sized to mesh with the drive spline 70 for rotating a rotatable shaft 198. The shaft 198 has threads 200 at its end containing the bushing 196, and a locking nut 202 locks the bushing 196 onto the drive spline 70. At the other end of the shaft 198 from the threads 200 are threads 204 onto which a cutting plate 206 is screwed. Cutting blades 208 are cutting means or elements, and are attached to the cutting plate 206.

At about midway along the length of the shaft 198 are a pair of thrust bearings 210 comprising an inner race 212 and an outer race 214. The inner race 212 of each thrust bearing is firmly attached to the bearing retainer 216, and the outer race 214 is jammed onto the shaft 198. A thrust bearing retainer nut 218 is screwed onto the threads 200 and keeps the outer race 214 of the thrust bearing 210 next to the threads 200 in place.

At the end of the shaft 198 next to the cutting plate 206 is a radial bearing 220 comprising an inner race 222 and an outer race 224. The inner race 222 is jammed onto the shaft 198 and the outer race 224 is firmly attached to a pin-type adapter 226. For the cutting device 194 illustrated in FIG. 6, the outer race 224 of the radial bearing 220 is firmly attached to a box-type adapter 228. The radial bearing 220 is an axial bearing means for providing support to the rotatable shaft 198 to maintain the cutting elements 208 in alignment with the secondary shoulder being refaced.

Again referring to both of the cutting devices 192 and 194, a calibrating nut 230 is screwed onto threads 232 on the outside surface of the thrust bearing retainer 216. A scale 234 shows the amount of material of the secondary shoulder that can be removed. The combination of the nut 230, the threads 232, and the scale 234 constitutes a measuring means for allotting the amount of tool joint secondary shoulder that may be removed. The measuring means in combination with the thrust bearings 210 and the thrust bearing retainer 216 is a means for providing measured axial movement of the rotatable shaft 198 toward the secondary shoulder being refaced. In operation, the calibrating nut 230 is turned until the scale 234 registers the same number that had been registered earlier on gauge 78 when material had been removed from a make-up shoulder. Drive spline 70 is then inserted into the bushing 196, and when power is supplied to the motor 74, the shaft 198 rotates, cutting material off of the secondary shoulder, as the calibrating nut 230 is slowly moved until the scale 234 registers the same amount of material having been removed as had been removed earlier from the make-up shoulder. For screwing and unscrewing box tool joints onto and off of threads 236 of the pin-type adapter 226, and for screwing and unscrewing pin tool joints onto and off of threads 238 of the box-type adapter 228, a make-up/break-out bar 242 fits into a cavity 240 in the pin type adapter 226, and fits into a cavity 244 in the box-type adapter 228. The make-up/break-out bar 242 also fits into a cavity 241 in the thrust bearing retainer 216 for screwing and unscrewing the retainer 216 from the adapters 226 and 228.

Referring back to FIGS. 2A and 2B, an adapter 245 comprises a drive spline 246 at one end of a shaft 247. The drive spline 246 is substantially identical to the drive spline 70. As mentioned previously, bushing 196 may be mated directly with drive spline 70. However, in operation it takes less time to merely add the adapter 245 to adapter 90, rather than disassemble the housing 62 from the gear reduction box 72. At the other end of shaft 247 is a threaded hollow cone similar to one-half of a double pin adapter 64. The hollow cone has threads 248 which mate with the threads 182 in the aperture 176 of the drive ring adapter 90. Thus, the adapter 245 is a second engaging means which engages the first engaging means, the first engaging means being the drive ring adapter 90 in combination with the mandrel 66. The make-up/break-out bar 242 fits into a cavity 243 for tightening and loosening the adapter 245 in the drive ring adapter 90. The adapter 245 is shown connected to the drive ring adapter 90 in FIG. 2A. When the drive spline 246 is mated with the bushing 196 as indicated by the arrow in FIG. 2A, the drive spline 70 from the gear reduction box 72 drives the mandrel 66, which in turn drives the adapter 246 having the drive spline 246 on its end, which in turn drives the shaft 198, which in turn causes the cutting blades 208 to reface the secondary shoulder 44a of the box tool joint 34. FIG. 1 illustrates a typical set-up for resurfacing the secondary shoulder 44a of the box tool joint 34.

One embodiment of the suspension apparatus 28 is illustrated in FIG. 1. The suspension apparatus 28 constitutes a support means. Suspension apparatus 28 includes a base 250 having legs 252 and 254 that lie on ground 30 coming together at one end to form a V, and a cross-member 256 connected between the legs 252 and 254 to complete the general shape of an A frame. The refacing tool is suspended from a cable 140. The cable 140 passes over several pulleys 258 spaced along L-shaped frame 260 attached and extending vertically from base legs 252 and 254. The frame 260 has an arm 262 extending substantially parallel to base 250 over the refacing tool. Connected in the cable line is a spring 264 of large capacity and the cable 140 is attached to a hoist mechanism 266 adjacent the base 250. The hoist mechanism 266 can be adjusted to tighten the cable 140 supporting the refacing device above the ground in a position opposite tool joint 20 and the hoist mechanism can be locked to retain this position. Spring 264, that is partially stretched, provides a resilient suspension for the refacing device 26, permitting up and down movement with the tool joint 20.

To counter the rotational effect of motor 74, an adjustable connection 268 is made between the refacing device and base 250. The adjustable connection 268 includes a leg 270 having a fork-shaped upper end 272 that embraces the motor casing 172 and is pivotally attached thereto by means of fasteners 274. The leg 270 slides freely at one end of a tubular mount 276. The other end of mount 276 is pivotally connected to a bifurcated receiver 278 which is in turn pivotally connected by pin 280 to cross member 256 for movement in 360° azimuth with reference to point of attachment of the bifurcated receiver 278.

The refacing device 26 is free to move when the suspension apparatus 28 is used, irrespective of the direction of the tool joint 20. Controlled up and down movement is permitted by spring 264 with connection 268 free moving in a vertical direction as leg 270 slides in mount 276. Movement of the refacing device 26 in the forward or rearward direction, as viewed in FIG. 1, is allowable through cable 140 suspending the refacing device and universal joint (bifurcated receiver) 278 attaching mount 276 to the base 250. Movement in a direction to either side, inwardly and outwardly from the plane of the drawing of FIG. 1, is allowable due to the arrangement just mentioned in connection with the forward and back movement of the refacing device 26. The refacing device 26 can pivot about the axis of mount 276, since the leg 270 freely rotates in the mount 276, and since the device 26 itself also pivots in the upper end 272.

Thus, the suspension apparatus 28 permits the free movement of the refacing device 26, which is necessary for accurately refacing an irregularly shaped tool joint or a tool joint which is welded to a bent or a deformed pipe.

Referring now to FIG. 9, the cable 140 of the suspension apparatus 28 may also be used to support the refacing device 26 in a vertical position. Attached to the gear reduction box housing 174 is a hook 282 to which the cable 140 attaches. The carriage 104 has a right-angle support 284 attached to the mounting plate 116. The right-angle support 284 supports the box tool joint 34. However, the box tool joint 34 is also supported by a support bar 286 which is part of the pipe rack stand 24. When a tool joint 20 is to be milled, it is firmly secured to the support bar 286 by means of a clamp 288. A milling means, or adapter, 290 is equipped with taper threads (not shown) which screw into the drive ring adapter 90 to form a solid connection for milling. The milling adapter 290 comprises a milling tool 292.

Referring now to FIG. 10, a section of a pin tool joint 32 is shown from an end view, and a spot 294 to be milled on the outside surface of the pin tool joint 32 is depicted in phantom. The spot 294 to be milled in FIG. 10 is also shown as an actual mill flat 296 in FIG. 12. FIG. 12 also shows two other types of identification milling done by the refacing device 26. The refacing device 26 mills an identification groove 295. The groove 295 identifies the grade of pipe. For example, as will be obvious to those skilled in the art, when the groove 295 is ¾ inches wide and ⅜ inches deep, the pipe is grade E. When the groove 295 is both ⅜ inches wide and deep, the pipe is grade S135. The refacing device 26 also mills a plug mill hole 297. The plug mill hole 297 is a flat bottom round hole of variable depth. FIG. 11 shows a box tool joint 34 which has been milled with the refacing device 26 in the horizontal position to produce a circular hardbanding groove 298. As will be obvious to those skilled in the art, the groove 298 is used for flush-mounted hardbanding.

The principles, preferred embodiments and modes of operation of the present invention have been described in the foregoing specification. The invention is not be constructed as limited to the particular forms disclosed, since these are regarded as illustrative rather than restrictive. Moreover, variations and changes may be made by those skilled in the art without departing from the spirit of the invention.

What is claimed is:

1. A portable multipurpose device for refacing a make-up shoulder and a secondary shoulder of a two-shoulder tool joint having a screw thread for engagement with another tool joint, the device comprising: a support means; a rotary drive source supported by said support means; a carriage means supported by said support means for movement parallel and transverse to a rotational axis of said rotary drive source; lathe tool means on said carriage; a first adapter having means to engage said screw thread of said tool joint and means for engagement with said rotary drive source to provide for rotary drive of said tool joint; said first adapter having a first gage means for measuring said make-up shoulder of said tool joint, whereby said make-up shoulder can be precisely refaced by said lathe tool means; a second adapter adapted to be substituted for said first adapter; said second adapter having rotary tool means and means to connect said rotary tool means with said source of rotary drive; said second adapter having means for engagement with said screw thread of said tool joint and having a second gage means calibrated corresponding to said first gage means for measuring said secondary shoulder, whereby said secondary shoulder can be precisely refaced by said rotary tool means in accordance with the amount of material removed from said make-up shoulder.

2. The device of claim 1 wherein said second adapter has external threads for engaging internal threads of a female tool joint.

3. The device of claim 1 wherein said second adapter has internal threads for engaging external threads of a male tool joint.

4. The device of claim 1 further comprising: a third adapter adapted for substitution in place of said first and second adapters; said third adapter having means for engagement with said rotary drive source and having rotary tool holding means; workholding means adapted for attachment to said carriage in place of said lathe tool means, whereby a milling operation may be performed on external surfaces of said tool joint.

* * * * *